UNITED STATES PATENT OFFICE.

ERNST BERTRAND, OF KLADNO, BOHEMIA, AUSTRIA-HUNGARY, ASSIGNOR TO THE POTTSTOWN IRON COMPANY, OF POTTSTOWN, PENNSYLVANIA.

COMPOSITION FOR BASIC BRICK.

SPECIFICATION forming part of Letters Patent No. 413,127, dated October 15, 1889.

Application filed July 19, 1888. Serial No. 280,438. (No specimens.)

*To all whom it may concern:*

Be it known that I, ERNST BERTRAND, a citizen of the United States, at present residing at Kladno, Bohemia, Austria-Hungary, have invented certain Improvements in Composition for Basic Bricks, of which the following is a specification.

The main object of my invention is to make for use in the construction of linings and bottoms of basic converters or furnaces a brick which will be much harder and more compact than bricks of the ordinary manufacture, so that the linings and bottoms built of material made from such bricks will last proportionately longer.

In the ordinary process of manufacturing these basic bricks for lining the walls and bottoms of furnaces or converters in which the basic process of making steel is carried on a limestone or dolomite (magnesian limestone) is obtained as pure as possible and especially free from silica. This is ground very fine, mixed with a little water, and pressed or rammed into bricks. The bricks thus formed are then dried and burned very hard. In making the linings with the aid of these bricks the latter are ground up in the usual manner.

In order to cause the brick for the purpose in question to shrink to a much harder and more compact mass, and to do it in a much shorter time, I add to the limestone or dolomite above described a small proportion of basic cinder—*i. e.*, calcareous phosphatic slag—with or without a small proportion of pure iron ore, both ground very fine and thoroughly admixed with the ground limestone or dolomite.

In practice I have found that where basic cinder alone is used this addition to the limestone will be in the proportion of from two to four per cent., and where pure iron ore is used, with the cinder to be added to the ground limestone or dolomite, a proportion of from one to two per cent. of cinder and from one to two per cent. of pure iron ore mixed will give good results. I do not, however, desire to confine myself within these limits.

What I have termed "basic cinder" is the slag which comes from the basic process, and which consists principally of lime with a proportion of iron, some phosphoric acid, and a small percentage of silica. If magnesian limestone be used, there will also be some magnesia, and oxide of manganese will of course be present if the pig-iron used contains manganese. The proportions of ingredients will vary in different cases, say, from forty-five to sixty-two per cent. of lime, from ten to twenty-two per cent. of iron, from three to six per cent. of silica, and from sixteen to thirty-two per cent. of phosphoric acid. An average proportion, where there is no magnesia or manganese present, may be given as fifty per cent. of lime, twenty per cent. of oxide of iron, four per cent. of silica, and twenty-six per cent. of phosphoric acid.

The effect of adding the basic cinder with or without the pure iron ore is to cause the brick to shrink to a much harder and more compact mass, and to do this in a much shorter time than when the limestone or dolomite alone is used. The harder and more compact the brick the longer the linings and bottoms will last, other things being equal. The shorter time required to burn the brick in the kiln the greater is the economy in fuel.

I claim as my invention—

1. A refractory lining consisting of a mixture of calcareous phosphatic slag and lime.

2. The herein-described lining-brick for basic converters or furnaces, said brick consisting of a mixture of limestone or dolomite and calcareous phosphatic slag, burned, substantially as described.

3. The herein-described lining-brick for basic converters or furnaces, said brick consisting of a mixture of limestone or dolomite with calcareous phosphatic slag and iron ore, burned, substantially as set forth.

In testimony whereof I have signed my name to this specification in the presence of two subscribing witnesses.

ERNST BERTRAND.

Witnesses:
GUSTAV MUCHAY,
ADOLF FIRCHEY.